(12) United States Patent
Chan

(10) Patent No.: US 11,211,864 B2
(45) Date of Patent: Dec. 28, 2021

(54) POWER SUPPLY DEVICE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/747,232

(22) Filed: Jan. 20, 2020

(65) Prior Publication Data
US 2020/0403507 A1 Dec. 24, 2020

(30) Foreign Application Priority Data

Jun. 19, 2019 (TW) ................. 108121209

(51) Int. Cl.
*H02M 3/156* (2006.01)
*H02M 1/12* (2006.01)
*H02M 1/44* (2007.01)

(52) U.S. Cl.
CPC ........... *H02M 3/156* (2013.01); *H02M 1/126* (2013.01); *H02M 1/44* (2013.01)

(58) Field of Classification Search
None
See application file for complete search history.

(56) References Cited

U.S. PATENT DOCUMENTS

| | | | |
|---|---|---|---|
| 2004/0130916 A1 | 7/2004 | Baarman | |
| 2007/0236967 A1* | 10/2007 | Liu | H02M 3/337 363/21.02 |
| 2011/0292691 A1* | 12/2011 | Matsumoto | H02M 3/33523 363/21.12 |
| 2013/0194831 A1* | 8/2013 | Hu | H02M 3/33569 363/21.01 |
| 2014/0092649 A1* | 4/2014 | Hsu | H02J 50/40 363/34 |

(Continued)

FOREIGN PATENT DOCUMENTS

| WO | 2015/062554 A1 | 5/2015 | |
|---|---|---|---|
| WO | WO-2015062554 A1 * | 5/2015 | ........ H02M 3/33569 |

OTHER PUBLICATIONS

Extended European Search Report dated Jul. 8, 2020, issued in application No. EP 19219155.

*Primary Examiner* — Jeffrey A Gblende

(74) *Attorney, Agent, or Firm* — McClure, Qualey & Rodack, LLP

(57) ABSTRACT

A power supply device includes a switch circuit, a resonant circuit, a first transformer, an output rectifier, a feedback circuit, and a controller. The switch circuit generates a switch voltage according to an input voltage, a first clock voltage, and a second clock voltage. The resonant circuit includes a variable capacitor and a variable inductor. The resonant circuit generates a resonant voltage according to the switch voltage, a first control voltage, and a second control voltage. The first transformer generates a transformation voltage according to the resonant voltage. The output rectifier generates an output voltage according to the transformation voltage. The feedback circuit and the controller detect a sensing voltage relative to the output rectifier. The feedback circuit determines the first control voltage according to the sensing voltage. The controller determines the second control voltage according to the sensing voltage.

9 Claims, 3 Drawing Sheets

(56) References Cited

U.S. PATENT DOCUMENTS

| | | | |
|---|---|---|---|
| 2015/0035376 A1* | 2/2015 | Baarman | H03J 7/04 |
| | | | 307/104 |
| 2015/0124490 A1 | 5/2015 | Sanuki et al. | |
| 2016/0079764 A1* | 3/2016 | Cho | H02J 50/80 |
| | | | 307/104 |
| 2018/0212469 A1* | 7/2018 | Liu | H02J 50/80 |

* cited by examiner

POWER SUPPLY DEVICE

CROSS REFERENCE TO RELATED APPLICATIONS

This application claims priority of Taiwan Patent Application No. 108121209 filed on Jun. 19, 2019, the entirety of which is incorporated by reference herein.

BACKGROUND OF THE INVENTION

Field of the Invention

The disclosure generally relates to a power supply device, and more specifically, to a power supply device for suppressing noise.

Description of the Related Art

The switching clock frequency of a switch circuit of a conventional power supply device is usually from 80 kHz to 140 kHz. During an EMI (Electromagnetic Interference) testing process, the double-frequency switching noise of a conventional power supply device may fall within a target range for the testing frequency, which may be from 150 kHz to 30 MHz, and the variable frequency range of the power supply device may be too large, thereby resulting in bad testing performance. Accordingly, there is a need to propose a novel solution for solving the problems of the prior art.

BRIEF SUMMARY OF THE INVENTION

In a preferred embodiment, the invention is directed to a power supply device that includes a switch circuit, a resonant circuit, a first transformer, an output rectifier, a feedback circuit, and a controller. The switch circuit generates a switch voltage according to an input voltage, a first clock voltage, and a second clock voltage. The resonant circuit includes a variable capacitor and a variable inductor. The resonant circuit generates a resonant voltage according to the switch voltage, a first control voltage, and a second control voltage. The first transformer generates a transformation voltage according to the resonant voltage. The output rectifier generates an output voltage according to the transformation voltage. The feedback circuit detects a sensing voltage relative to the output rectifier. The feedback circuit determines the first control voltage according to the sensing voltage, so as to control the tunable capacitance of the variable capacitor. The controller detects the sensing voltage relative to the output rectifier. The controller determines the second control voltage according to the sensing voltage, so as to control the tunable inductance of the variable inductor.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
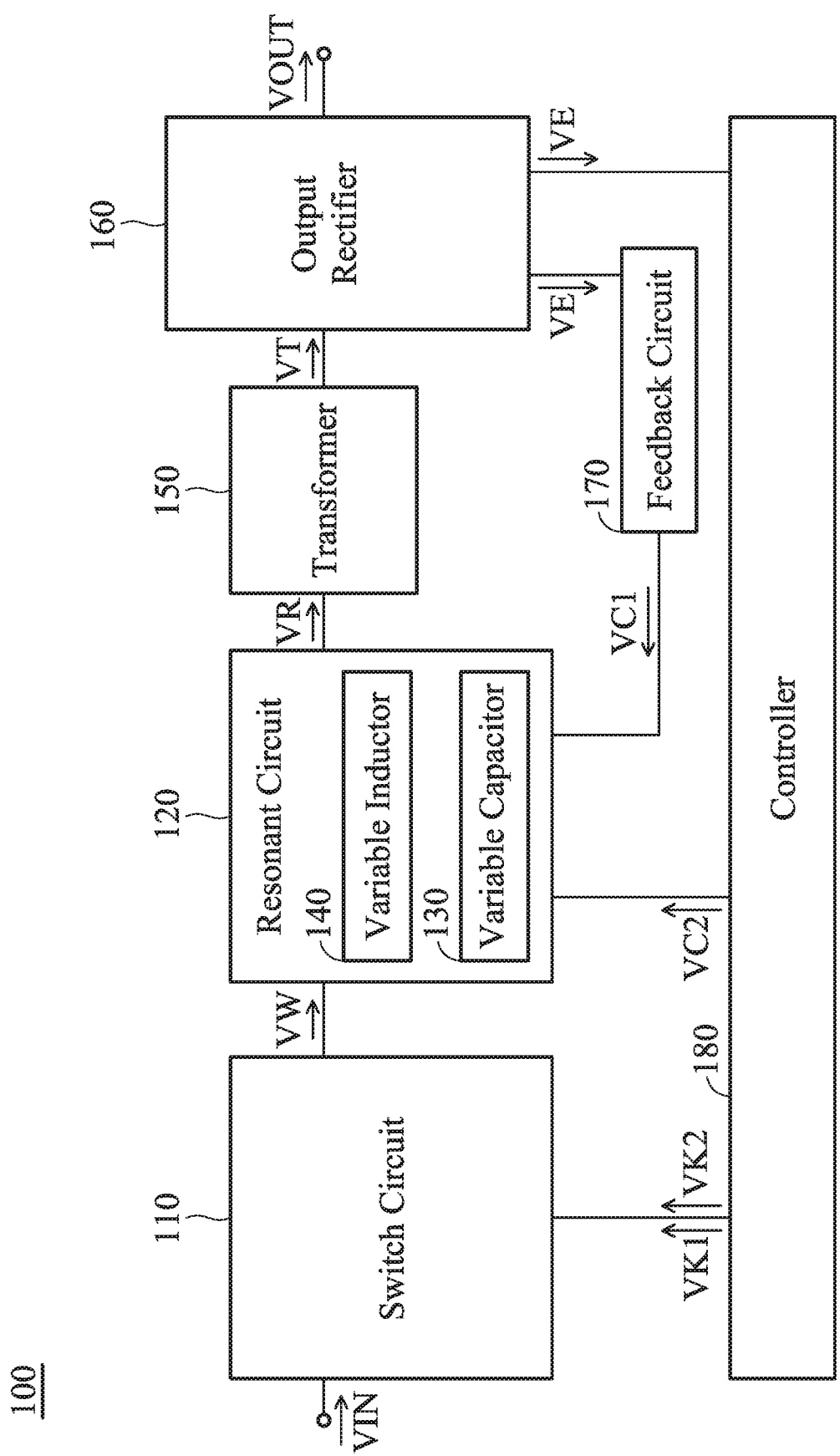
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a switch circuit 110, a resonant circuit 120, a first transformer 150, an output rectifier 160, a feedback circuit 170, and a controller 180. The resonant circuit 120 includes a variable capacitor 130 and a variable inductor 140. It should be noted that the power supply device 100 may further include other components, such as a voltage regulator, although they are not displayed in FIG. 1.

The switch circuit 110 generates a switch voltage VW according to an input voltage VIN, a first clock voltage VK1, and a second clock voltage VK2. The input voltage VIN may be from an external power source. The input voltage VIN may be an AC (Alternating Current) voltage with any frequency and any magnitude. For example, the frequency of the AC voltage may be about 50 Hz or 60 Hz, and the RMS (Root-Mean-Square) value of the AC voltage may be about 110V or 220V, but they are not limited thereto. The operation frequency of each of the first clock voltage VK1 and the second clock voltage VK2 may be from 80 kHz to 140 kHz, which is considered as a switching frequency of the power supply device 100. The first clock voltage VK1 and the second clock voltage VK2 may have complementary logic levels. That is, if the first clock voltage VK1 has a low logic level (logic "0"), the second clock voltage VK2 must have a high logic level (logic "1"), and if the first clock voltage VK1 has a high logic level, the second clock voltage VK2 must have a low logic level. The resonant circuit 120 generates a resonant voltage VR according to the switch voltage VW, a first control voltage VC1, and a second control voltage VC2. The first transformer 150 generates a transformation voltage VT according to the resonant voltage VR. The output rectifier 160 generates an output voltage VOUT according to the transformation voltage VT. The output voltage VOUT may be a DC (Direct Current) voltage with any voltage level. For example, the level of the output voltage VOUT may be constant 19V, but it is not limited thereto. The feedback circuit 170 detects a sensing voltage VE relative to the output rectifier 160. The feedback circuit 170 determines the first control voltage VC1 according to the sensing voltage VE, so as to control the tunable capacitance of the variable capacitor 130. The controller 180 may be a PWM (Pulse Width Modulation) IC (Integrated Circuit). In some embodiments, the controller 180 includes a detecting circuit, a comparing circuit, and a processing circuit (not shown). The controller 180 detects the sensing voltage VE relative to the output rectifier 160. The controller 180 determines the second control voltage VC2 according to the sensing voltage VE, so as to control the tunable inductance of the variable inductor 140. In response to different output currents, the power supply device 100 may operate in a light-load mode or a heavy-load mode. Each of the first clock voltage VK1 and the second clock voltage VK2 may have a light-load operation frequency or a heavy-load operation frequency. The light-load operation frequency may be higher than the heavy-load operation frequency. For example, the light-load operation frequency may be about 133 kHz, and the heavy-load operation frequency may be about 90 kHz, but they are not limited thereto. By appropriately controlling the variable capacitor 130 and the variable inductor 140, the resonant circuit 120 can provide different impedance values in response to the light-load mode or the heavy-load mode, thereby improving the EMI testing result of the power supply device 100.

The following embodiments will introduce the detailed structure and operation of the power supply device 100. It should be understood these figures and descriptions are merely exemplary, rather than limitations of the invention.

Figure 2:
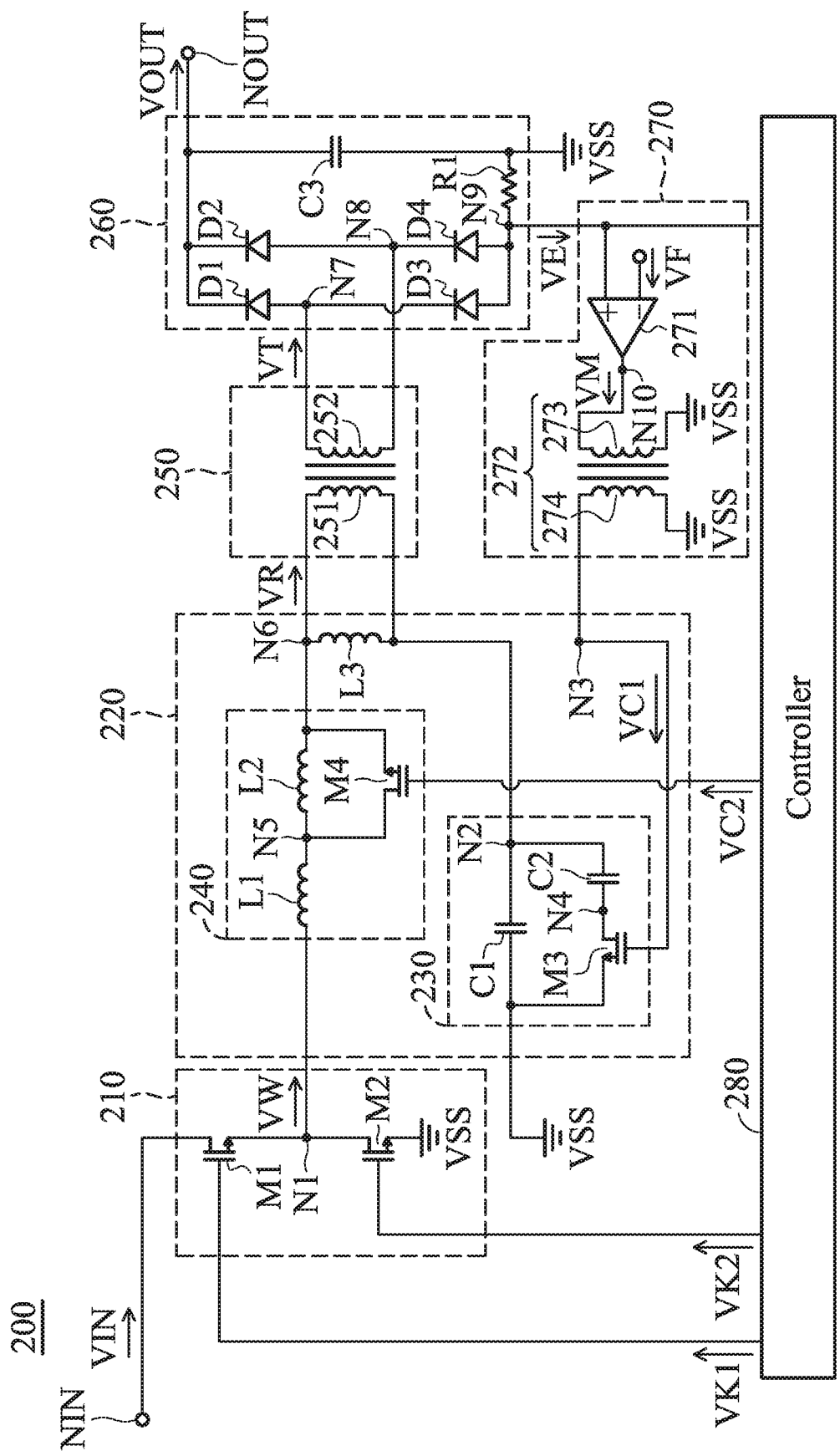
FIG. 2 is a diagram of a power supply device according to an embodiment of the invention.

FIG. 2 is a diagram of a power supply device 200 according to an embodiment of the invention. In the embodiment of FIG. 2, the power supply device 200 with an input node NIN and an output node NOUT includes a switch circuit 210, a resonant circuit 220, a first transformer 250, an output rectifier 260, a feedback circuit 270, and a controller 280. The input node NIN of the power supply device 200 is arranged for receiving an input voltage VIN from an external power source. The output node NOUT of the power supply device 200 is arranged for outputting an output voltage VOUT to an electronic device (e.g., a notebook computer).

The switch circuit 210 includes a first transistor M1 and a second transistor M2. For example, each of the first transistor M1 and the second transistor M2 may be an NMOS transistor (N-type Metal Oxide Semiconductor Field Effect Transistor). The first transistor M1 has a control terminal (or a gate) coupled to the controller 280 to receive a first clock voltage VK1, a first terminal (or a source) coupled to a first node N for outputting a switch voltage VW, and a second terminal (or a drain) coupled to the input node NIN. The second transistor M2 has a control terminal (or a gate) coupled to the controller 280 to receive a second clock voltage VK2, a first terminal (or a source) coupled to a ground voltage VSS (e.g., 0V), and a second terminal (or a drain) coupled to the first node N1. Because the first clock voltage VK1 and the second clock voltage VK2 have complementary logic levels, the first transistor M1 and the second transistor M2 have complementary operation modes. For example, if the first transistor M1 is enabled, the second transistor M2 may be disabled, and if the first transistor M1 is disabled, the second transistor M2 may be enabled.

The resonant circuit 220 includes a variable capacitor 230 and a variable inductor 240. The variable capacitor 230 includes a first capacitor C1, a second capacitor C2, and a third transistor M3. The third transistor M3 may be an NMOS transistor. The first capacitor C1 has a first terminal coupled to a second node N2, and a second terminal coupled to the ground voltage VSS. The third transistor M3 has a control terminal (or a gate) coupled to a third node N3 for receiving a first control voltage VC1, a first terminal (or a source) coupled to the ground voltage VSS, and a second terminal (or a drain) coupled to a fourth node N4. The second capacitor C2 has a first terminal coupled to the second node N2, and a second terminal coupled to the fourth node N4. The variable inductor 240 includes a first inductor L1, a second inductor L2, and a fourth transistor M4. The fourth transistor M4 may be an NMOS transistor. The first inductor L1 has a first terminal coupled to the first node N1 for receiving the switch voltage VW, and a second terminal coupled to a fifth node N5. The second inductor L2 has a first terminal coupled to the fifth node N5, and a second terminal coupled to a sixth node N6 for outputting a resonant voltage VR. The fourth transistor M4 has a control terminal (or a gate) coupled to the controller 280 to receive a second control voltage VC2, a first terminal (or a source) coupled to the sixth node N6, and a second terminal (or a drain) coupled to the fifth node N5. The resonant circuit 220 may further include a third inductor L3. The magnetizing inductance of the first transformer 250 may contribute to the third inductor L3. The third inductor L3 may not be an independent circuit element. The third inductor L3 has a first terminal coupled to the sixth node N6, and a second terminal coupled to the second node N2.

The first transformer 250 includes a first main coil 251 and a first secondary coil 252. The first main coil 251 may be positioned at a side of the first transformer 250. The first secondary coil 252 may be positioned at the opposite side of the first transformer 250. The first main coil 251 has a first terminal coupled to the sixth node N6 for receiving the resonant voltage VR, and a second terminal coupled to the second node N2. The first secondary coil 252 has a first terminal coupled to a seventh node N7 for outputting a transformation voltage VT, and a second terminal coupled to an eighth node N8.

The output rectifier 260 includes a first diode D1, a second diode D2, a third diode D3, a fourth diode D4, a resistor R1, and a third capacitor C3. The first diode D1 has an anode coupled to the seventh node N7 for receiving the transformation voltage VT, and a cathode coupled to an output node NOUT. The second diode D2 has an anode coupled to the eighth node N8, and a cathode coupled to the output node NOUT. The third diode D3 has an anode coupled to a ninth node N9, and a cathode coupled to the seventh node N7. The fourth diode D4 has an anode coupled to the ninth node N9, and a cathode coupled to the eighth node N8. The resistor R1 has a first terminal coupled to the ninth node N9 for outputting a sensing voltage VE to the feedback circuit 270 and the controller 280, and a second terminal coupled to the ground voltage VSS. The third capacitor C3 has a first terminal coupled to the output node NOUT, and a second terminal coupled to the ground voltage VSS.

The feedback circuit 270 includes a comparator 271 and a second transformer 272. The comparator 271 generates a comparison voltage VM according to the sensing voltage VE and a reference voltage VF. Specifically, the comparator 271 has a positive input terminal coupled to the ninth node N9 for receiving the sensing voltage VE, a negative input terminal for receiving the reference voltage VF, and an output terminal coupled to a tenth node N10 for outputting the comparison voltage VM. For example, if the sensing voltage VE is higher than or equal to the reference voltage VF, the comparator 271 may output the comparison voltage VM having a high logic level, and if the sensing voltage VE is lower than the reference voltage VF, the comparator 271 may output the comparison voltage VM having a low logic level. The second transformer 272 generates the first control voltage VC1 according to the comparison voltage VM. Specifically, the second transformer 272 includes a second main coil 273 and a second secondary coil 274. The second main coil 273 may be positioned at a side of the second transformer 272. The second secondary coil 274 may be positioned at the opposite side of the second transformer 272. The second main coil 273 has a first terminal coupled to the tenth node N10 for receiving the comparison voltage VM, and a second terminal coupled to the ground voltage VSS. The second secondary coil 274 has a first terminal coupled to the third node N3 for outputting the first control voltage VC1, and a second terminal coupled to the ground voltage VSS.

The controller 280 can compare the sensing voltage VE with a threshold voltage. For example, the threshold voltage may be substantially equal to the aforementioned reference voltage VF, but it is not limited thereto. Specifically, if the sensing voltage VE is higher than or equal to the threshold voltage, the controller 280 may output the second control voltage VC2 having a low logic level, and if the sensing voltage VE is lower than the threshold voltage, the controller 280 may output the second control voltage VC2 having a high logic level.

The operation principles of the power supply device 200 may be described as follows. The power supply device 200 may operate in a light-load mode or a heavy-load mode, and the two modes correspond to different switching frequencies. In the light-load mode, each of the first clock voltage VK1 and the second clock voltage VK2 has a light-load operation frequency. In the heavy-load mode, each of the first clock voltage VK1 and the second clock voltage VK2 has a heavy-load operation frequency. The light-load operation frequency may be higher than the heavy-load operation frequency. For example, the light-load operation frequency may be about 133 kHz, and the heavy-load operation frequency may be about 90 kHz, but they are not limited thereto.

When the power supply device 200 operates in the light-load mode, the sensing voltage VE of the output rectifier 260 may be a relatively low voltage (because the output current of the output rectifier 260 is relatively small). At this time, the feedback circuit 270 can generate the first control voltage VC1 having a low logic level to disable the third transistor M3, and the controller 280 can generate the second control voltage VC2 having a high logic level to enable the fourth transistor M4. In the light-load mode, the second capacitor C2 and the second inductor L2 are not in use, and the operation characteristic of the resonant circuit 220 is described according to the following equations (1) to (4).

$$CT = C1 \qquad (1)$$

$$LT = L1 \qquad (2)$$

$$K = \frac{L3}{LT} = \frac{L3}{L1} \qquad (3)$$

$$Q \propto \sqrt{\frac{LT}{CT}} = \sqrt{\frac{L1}{C1}} \qquad (4)$$

where "CT" represents the tunable capacitance of the variable capacitor 230, "C1" represents the capacitance of the first capacitor C1, "LT" represents the tunable inductance of the variable inductor 240, "L1" represents the inductance of the first inductor L1, "L3" represents the inductance of the third inductor L3, "K" represents the inductive ratio of the resonant circuit 220, and "Q" represents the quality factor of the resonant circuit 220.

When the power supply device 200 operates in the heavy-load mode, the sensing voltage VE of the output rectifier 260 may be a relatively high voltage (because the output current of the output rectifier 260 is relatively large). At this time, the feedback circuit 270 can generate the first control voltage VC1 having a high logic level to enable the third transistor M3, and the controller 280 can generate the second control voltage VC2 having a low logic level to disable the fourth transistor M4. In the heavy-load mode, the second capacitor C2 is coupled in parallel with the first capacitor C1, and the second inductor L2 is coupled in series with the first inductor L1, such that the operation characteristic of the resonant circuit 220 is described according to the following equations (5) to (8).

$$CT = C1 + C2 \qquad (5)$$

$$LT = L1 + L2 \qquad (6)$$

$$K = \frac{L3}{LT} = \frac{L3}{L1 + L2} \qquad (7)$$

$$Q \propto \sqrt{\frac{LT}{CT}} = \sqrt{\frac{L1 + L2}{C1 + C2}} \qquad (8)$$

where "CT" represents the tunable capacitance of the variable capacitor 230, "C1" represents the capacitance of the first capacitor C1, "C2" represents the capacitance of the second capacitor C2, "LT" represents the tunable inductance of the variable inductor 240, "L1" represents the inductance of the first inductor L1, "L2" represents the inductance of the second inductor L2, "L3" represents the inductance of the third inductor L3, "K" represents the inductive ratio of the resonant circuit 220, and "Q" represents the quality factor of the resonant circuit 220.

As described above, when the power supply device 200 switches from the light-load mode to the heavy-load mode, the inductive ratio K becomes smaller. According to practical measurements, the smaller inductive ratio K can reduce the whole variable frequency range of the power supply device 200, thereby improving the EMI testing result of the power supply device 200. Furthermore, when the power supply device 200 switches from the light-load mode to the heavy-load mode, both the tunable capacitance of the variable capacitor 230 and the tunable inductance of the variable inductor 240 become larger, and such a design can avoid too high the quality factor Q, so as to enhance the circuit stability of the power supply device 200.

Figure 3:
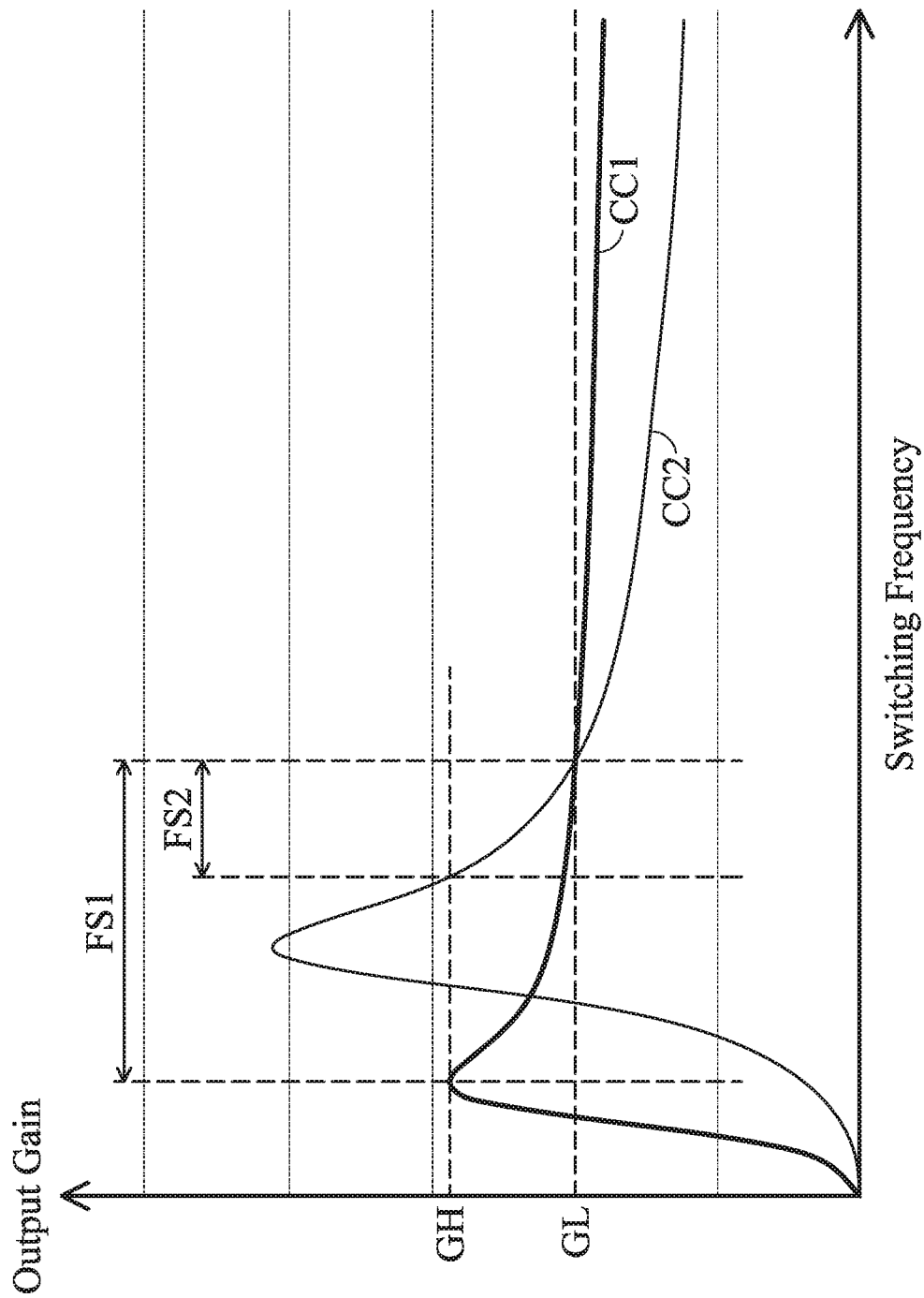
FIG. 3 is a frequency response diagram of output gain of a power supply device according to an embodiment of the invention.

FIG. 3 is a frequency response diagram of output gain of the power supply device 200 according to an embodiment of the invention. The horizontal axis represents the switching frequency, and the vertical axis represents the output gain. As shown in FIG. 3, a first curve CC1 represents the operation characteristic of the power supply device using the conventional resonant circuit, and a second curve CC2 represents the operation characteristic of the power supply device 200 using the proposed resonant circuit 220. According to the measurement of FIG. 3, the gain GL requested by the light-load mode does not change so much. On the other hand, in order to achieve the gain GH requested by the heavy-load mode, the variable frequency range FS2 of the proposed power supply device 200 is much smaller than the variable frequency range FS1 of the conventional power supply device. According to practical measurements, the design of the invention can have the function of suppressing noise.

In some embodiments, the element parameters of the power supply device 200 are described as follows. The resistance of the resistor R1 may be from 0.18Ω to 0.22Ω, such as 0.2Ω. The capacitance of the first capacitor C1 may be from 20 nF to 30 nF, such as 25 nF. The capacitance of the second capacitor C2 may be from 12 nF to 18 nF, such as 15 nF. The capacitance of the third capacitor C3 may be from 1200 µF to 1800 µF, such as 1500 µF. The inductance of the first inductor L1 may be from 9 µH to 11 µH, such as 10 µF. The inductance of the second inductor L2 may be from 63 µH to 77 µH, such as 70 µF. The inductance of the third inductor L3 may be from 180 µH to 220 µH, such as 200 µF. The turn ratio of the first main coil 251 to the first secondary coil 252 may be from 10 to 30, such as 20. The turn ratio of the second main coil 273 to the second secondary coil 274 may be from 0.1 to 1, such as 0.2. When the power supply device 200 operates in the light-load mode, the sensing voltage VE of the output rectifier 260 may be about 0.04V. When the power supply device 200 operates in the heavy-load mode, the sensing voltage VE of the output rectifier 260 may be about 3.4V. Both the threshold voltage and the reference voltage VF, compared with the sensing voltage VE, may be about 3.3V. The above ranges of parameters are calculated and obtained according to the results of many experiments, and they help to optimize the transformation efficiency and noise suppression of the power supply device 200.

The invention proposes a novel power supply device which includes a resonant circuit using a variable capacitor and a variable inductor. According to practical measurements, the aforementioned resonant circuit can effectively reduce the variable frequency range of the power supply device, so as to meet the requirements of IEC (International Electro Technical Commission). Generally, the power supply device of the invention can significantly improve the EMI testing result, and it is suitable for application in a variety of electronic devices.

Note that the above voltages, currents, resistances, inductances, capacitances and other element parameters are not limitations of the invention. A designer can adjust these parameters according to different requirements. The power supply device of the invention is not limited to the configurations of FIGS. 1-3. The invention may merely include any one or more features of any one or more embodiments of FIGS. 1-3. In other words, not all of the features displayed in the figures should be implemented in the power supply circuit of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A power supply device, comprising:
a switch circuit, generating a switch voltage according to an input voltage, a first clock voltage, and a second clock voltage;
a resonant circuit, comprising a variable capacitor and a variable inductor, wherein the resonant circuit generates a resonant voltage according to the switch voltage, a first control voltage, and a second control voltage;
a first transformer, generating a transformation voltage according to the resonant voltage;
an output rectifier, generating an output voltage according to the transformation voltage;
a feedback circuit, detecting a sensing voltage relative to the output rectifier, wherein the feedback circuit determines the first control voltage according to the sensing voltage, so as to control a tunable capacitance of the variable capacitor; and
a controller, detecting the sensing voltage relative to the output rectifier, wherein the controller determines the second control voltage according to the sensing voltage, so as to control a tunable inductance of the variable inductor;
wherein the switch circuit comprises:
a first transistor, wherein the first transistor has a control terminal coupled to the controller to receive the first clock voltage, a first terminal coupled to a first node for outputting the switch voltage, and a second terminal coupled to an input node for receiving the input voltage; and
a second transistor, wherein the second transistor has a control terminal coupled to the controller to receive the second clock voltage, a first terminal coupled to a ground voltage, and a second terminal coupled to the first node;
wherein the variable capacitor of the resonant circuit comprises:
a first capacitor, wherein the first capacitor has a first terminal coupled to a second node, and a second terminal coupled to the ground voltage;
a third transistor, wherein the third transistor has a control terminal coupled to a third node for receiving the first control voltage, a first terminal coupled to the ground voltage, and a second terminal coupled to a fourth node; and
a second capacitor, wherein the second capacitor has a first terminal coupled to the second node, and a second terminal coupled to the fourth node;
wherein the variable inductor of the resonant circuit comprises:
a first inductor, wherein the first inductor has a first terminal coupled to the first node for receiving the switch voltage, and a second terminal coupled to a fifth node; and
a second inductor, wherein the second inductor has a first terminal coupled to the fifth node, and a second terminal coupled to a sixth node for outputting the resonant voltage.

2. The power supply device as claimed in claim 1, wherein the variable inductor of the resonant circuit further comprises:
a fourth transistor, wherein the fourth transistor has a control terminal coupled to the controller to receive the second control voltage, a first terminal coupled to the sixth node, and a second terminal coupled to the fifth node.

3. The power supply device as claimed in claim 2, wherein the resonant circuit further comprises:
    a third inductor, wherein the third inductor has a first terminal coupled to the sixth node, and a second terminal coupled to the second node.

4. The power supply device as claimed in claim 3, wherein the first transformer comprises:
    a first main coil, wherein the first main coil has a first terminal coupled to the sixth node for receiving the resonant voltage, and a second terminal coupled to the second node; and
    a first secondary coil, wherein the first secondary coil has a first terminal coupled to a seventh node for outputting the transformation voltage, and a second terminal coupled to an eighth node.

5. The power supply device as claimed in claim 4, wherein the output rectifier comprises:
    a first diode, wherein the first diode has an anode coupled to the seventh node for receiving the transformation voltage, and a cathode coupled to an output node for outputting the output voltage;
    a second diode, wherein the second diode has an anode coupled to the eighth node, and a cathode coupled to the output node;
    a third diode, wherein the third diode has an anode coupled to a ninth node, and a cathode coupled to the seventh node; and
    a fourth diode, wherein the fourth diode has an anode coupled to the ninth node, and a cathode coupled to the eighth node.

6. The power supply device as claimed in claim 5, wherein the output rectifier further comprises:
    a resistor, wherein the resistor has a first terminal coupled to the ninth node for outputting the sensing voltage to the feedback circuit and the controller, and a second terminal coupled to the ground voltage; and
    a third capacitor, wherein the third capacitor has a first terminal coupled to the output node, and a second terminal coupled to the ground voltage.

7. The power supply device as claimed in claim 6, wherein the feedback circuit comprises a comparator and a second transformer, the comparator generates a comparison voltage according to the sensing voltage and a reference voltage, and the second transformer generates the first control voltage according to the comparison voltage.

8. The power supply device as claimed in claim 7, wherein the comparator has a positive input terminal coupled to the ninth node for receiving the sensing voltage, a negative input terminal for receiving the reference voltage, and an output terminal coupled to a tenth node for outputting the comparison voltage.

9. The power supply device as claimed in claim 8, wherein the second transformer of the feedback circuit comprises:
    a second main coil, wherein the second main coil has a first terminal coupled to the tenth node for receiving the comparison voltage, and a second terminal coupled to the ground voltage; and
    a second secondary coil, wherein the second secondary coil has a first terminal coupled to the third node for outputting the first control voltage, and a second terminal coupled to the ground voltage.

* * * * *